UNITED STATES PATENT OFFICE.

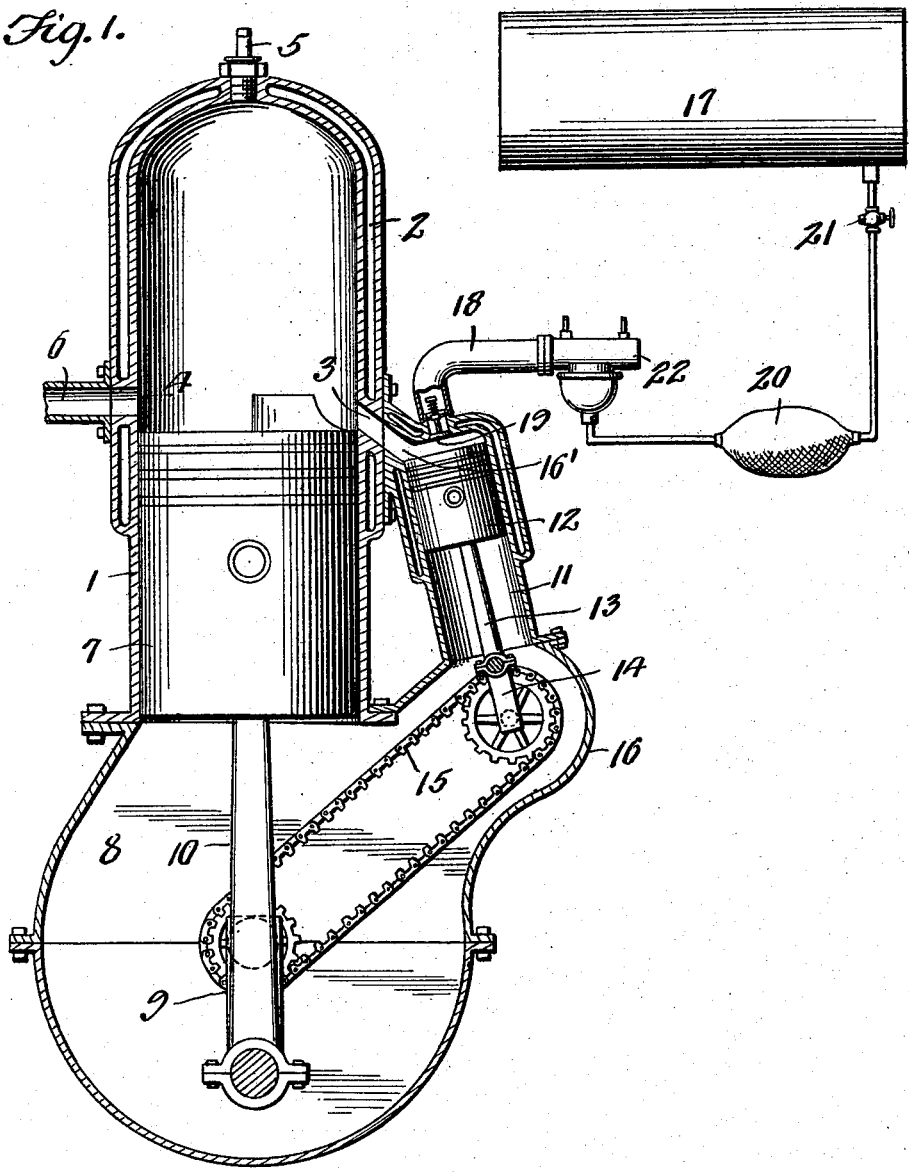

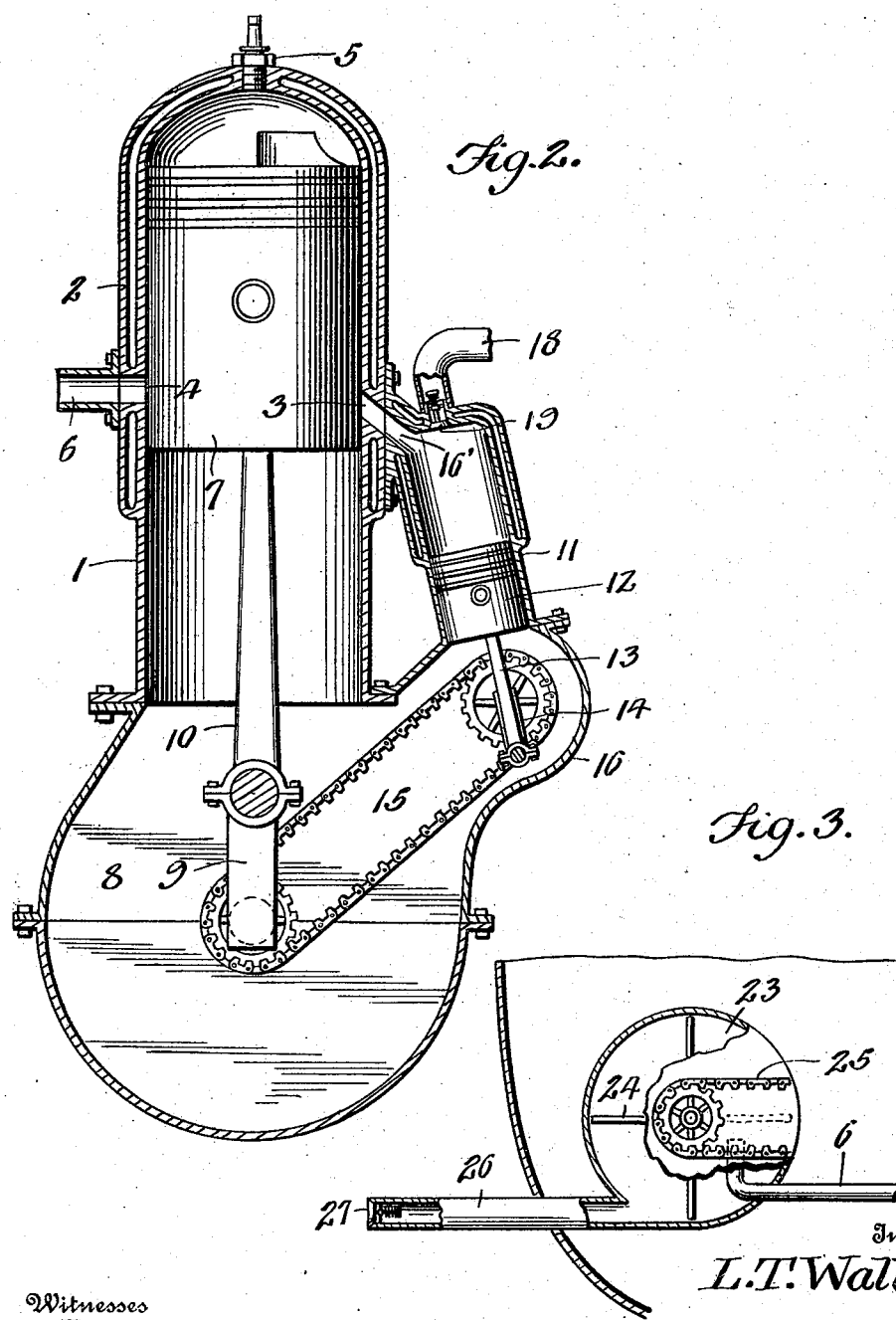

LEO T. WALLEN, OF NEWARK, NEW JERSEY.

INTERNAL-COMBUSTION ENGINE.

1,216,895.  Specification of Letters Patent.  Patented Feb. 20, 1917.

Application filed February 9, 1916. Serial No. 77,205.

*To all whom it may concern:*

Be it known that I, LEO T. WALLEN, a citizen of the United States, residing at Newark, in the county of Essex and State of New Jersey, have invented new and useful Improvements in Internal-Combustion Engines, of which the following is a specification.

This invention relates to internal combustion engines, the broad object of the invention being to produce in connection with an engine of the reciprocatory type and embodying a main power cylinder, a reciprocatory piston, a crank shaft, and a crank case, charge compressing and injecting means for supplying the combustion chamber of the power cylinder with an explosive mixture under compression, the said charge compressing means bearing a novel and particularly efficient and reliable relation to the main power or combustion cylinder whereby all working parts thus far referred to are maintained in efficient working condition at all times.

A further object of the invention is to provide in conjunction with an engine of the character above referred to, novel means for supplying compressed air to the charging and compressing mechanism of the engine, together with means for equalizing the pressure of air between the time it leaves the storage tank or reservoir and the time it reaches the engine.

A further object in view is to provide in conjunction with an engine of the character above referred to, means for effecting a quick and reliable exhaust of the burned gases from the combustion chamber of the engine.
A further object in view is to provide an engine of the class referred to which is particularly adapted for submarine work, the engine and the remainder of the apparatus intimately associated therewith being of such a character as to enable the engine to be furnished with the necessary air or oxygen to maintain the same in operation while the vessel is submerged.

With the above and other objects in view, the invention consists in the novel construction, combination and arrangement of parts, as herein described, illustrated and claimed.

In the accompanying drawings:—

Figure 1 is a sectional view of an engine embodying the present invention, the section being taken diametrically of the cylinder, and certain parts being shown in elevation, with the power piston at the limit of its power stroke and the charging piston at the limit of its charging stroke.

Fig. 2 is a similar view showing the position of the parts after the power piston has reached the firing point and the charging piston has reached the limit of its suction stroke.

Fig. 3 is a sectional view illustrating the exhaust mechanism.

Referring to the drawings 1 designates the main power or combustion cylinder which is provided with the usual water jacket 2, the intake port 3, the exhaust port 4 and the igniter or spark plug 5, 6 designating an exhaust pipe communicating with the exhaust port 4. The engine also comprises the reciprocatory piston 7, crank case 8, crank shaft 9 and connecting rod 10. All of the parts thus far described are of the well known type employed in two cycle engine practice.

In carrying out the present invention, I employ charging and compressing means which in the preferred embodiment of this invention comprises a compressing and charging cylinder 11 in which is mounted a reciprocatory piston 12 from which a connecting rod 13 extends to a second crank shaft 14 driven from the main crank shaft 9 by means of a silent chain 15 running over corresponding sprocket wheels on the shafts 9 and 14. It is to be noted that, as shown, the crank shaft 14 is driven at the same speed as the main crank shaft 9. To accommodate the crank shaft 14 and the sweep of the connecting rod bearing thereon the crank case 8 is provided with an enlargement or offset 16 as shown.

The charging cylinder 11 is open at that end which is connected directly to the crank case 8 as clearly shown in Figs. 1 and 2 and therefore the splash lubrication obtained for the main piston 7 and cylinder 1 is also obtained for the charging and compressing cylinder 11 and the piston working therein. Thus efficient lubrication is obtained for both cylinders and pistons. The cylinder 11 is provided with a discharge port 16′ immediately adjacent to the head thereof and communicating directly with the intake port 3 of the combustion chamber of the main cylinder 1. Furthermore, the crank shafts 9 and 14 are so geared together that when the main piston 7 is at the inner end of its firing stroke as shown in Fig. 1, the charging piston 12 is at the outer limit of its charging stroke as shown in the same figure. The arrangement is also such that when the main piston 7 is at the outer limit of its compression stroke, it covers the intake port 3 and the outlet port 16' of the charging cylinder, while the charging and compressing piston 12 is at the end of its suction stroke, corresponding with the beginning of its working or compressing stroke as shown in Fig. 2.

In conjunction with the engine thus far described, I employ a compressed air tank or reservoir 17 from which a conduit 18 extends to the charging and compressing cylinder, preferably communicating therewith through the head of the cylinder 11, at which point there is placed an automatic or mechanical intake check valve 19 so as to prevent back pressure through the conduit 18, the valve 19 opening to allow a charge to be drawn into the cylinder 11 by the suction of the piston 12. In communication with the conduit 18 is a flexible pressure equalizing bag or sack 20 preferably of some elastic material which will expand to a predetermined extent and then be incapable of further expansion by reason of the pressure of air in the reservoir 17. The bag 20 serves to equalize the pressure of the supply of air to the carbureter and the cylinder 12 under a predetermined pressure. Furthermore, the conduit 18 is equipped with a cut-off and regulating valve 21 which is located between the reservoir 17 and the pressure regulating bag 20. A carbureter 22 is shown as incorporated in the conduit 18, the carbureter being of any ordinary or preferred construction which will effect a mixture of air and fuel before the mixture is drawn into the charging and compressing cylinder 11.

In order to insure the exhaust of the burned gases from the combustion chamber when the engine is being used in a submarine boat, a suction device such as a fan 23 is connected with the exhaust pipe 6 as shown in Fig. 3. The fan 24 therein may be driven in any suitable manner by means of a driving chain 25 actuated by the engine shaft and the casing of the fan is provided with a discharge outlet or pipe 26 which is extended through the hull and outboard, said pipe 26 being provided with a check valve 27 which will prevent water from entering the pipe 26 while permitting the exhaust gases under pressure to be forced outwardly into the water below the surface thereof.

From the foregoing description, taken in connection with the accompanying drawings, it will now be understood that the engine hereinabove described, which is of the internal combustion two cycle type, is especially adapted for use in submarine boats as it will operate and drive the vessel even when submerged. The supply of air for the reservoir 17 may be compressed therein when the vessel is on the surface of the water or in port and of course the size of the reservoir 17 may be such as to give the desired range of operation of the vessel or boat in conjunction with which the engine is used.

In the firing stroke of the piston 7, the charging piston 12 is compressing while the compressed charge is withheld from the combustion chamber of the main cylinder on account of the intake port 3 being closed by the main piston 7. When the piston 7 reaches the limit of its power stroke, however, the intake port 3 is uncovered and the charge compressed in the cylinder 11 is liberated and quickly enters and fills the main combustion chamber, driving out the burned gases ahead of the same. As the main piston 7 starts on its return or compression stroke, the intake port 3 is again covered and at the same time the compressing and charging piston 7 starts on its suction stroke. When the piston 7 starts on its firing stroke, the cylinder 11 has received a full charge of mixture which is then compressed by the piston 12 during the power stroke of the main piston 7. One of the important features of the construction and arrangement hereinabove described resides in the direct communication between the charging and compressing cylinder and the crank case, for it is by reason of said arrangement that the charging mechanism including the cylinder 11 and the piston 12, as well as the connecting rod bearing for the shaft 14 and the main bearings for the shaft 14 and also the chain 15 are maintained in a perfectly lubricated condition by the splash system which obtains in the crank case 8 and is used for the lubrication of the main cylinder and power piston. When the engine is used in connection with an automobile or for open air service, the compressed air reservoir together with the air bag may be dispensed with for the time being.

Having thus described my invention, I claim:—

The combination with a submarine boat, of an internal combustion engine mounted within the hull thereof, and having intake and exhaust ports, a charging and compressing cylinder communicating with the intake port of said engine, a compressed air reservoir, a valve controlled and regulated conduit leading from said reservoir to the charging and compressing cylinder, a carbureter in said conduit, and a pressure equalizing bag in communication with said conduit between the reservoir and carbureter, an exhaust pipe leading from the exhaust port of the engine, a suction fan to which said exhaust pipe leads, and an underwater exhaust pipe leading from said suction fan through the hull of the boat.

In testimony whereof I affix my signature in presence of two witnesses.

LEO T. WALLEN.

Witnesses:
HENRY GNATZ,
MARTIN GNATZ.

Copies of this patent may be obtained for five cents each, by addressing the "Commissioner of Patents, Washington, D. C."